United States Patent [19]

Avelöv

[11] Patent Number: 4,982,928

[45] Date of Patent: Jan. 8, 1991

[54] WATER OUTLET FITTING WITH SOUND DAMPER INSERT

[75] Inventor: Rolf I. Avelöv, Mjölby, Sweden

[73] Assignee: Danfoss A/S, Nordborg, Denmark

[21] Appl. No.: 415,575

[22] Filed: Oct. 2, 1989

[30] Foreign Application Priority Data

Oct. 14, 1988 [DE] Fed. Rep. of Germany ....... 3834997

[51] Int. Cl.$^5$ .................... F16K 47/02; F16L 55/02
[52] U.S. Cl. .................... 251/118; 251/127; 138/41
[58] Field of Search .................... 251/118, 127; 138/41

[56] References Cited

U.S. PATENT DOCUMENTS

| | | |
|---|---|---|
| 597,842 | 1/1898 | Edmands .................... 251/118 |
| 4,402,485 | 9/1983 | Fagerlund .................... 251/118 |
| 4,506,860 | 3/1985 | Von Schwerdtner et al. .... 251/118 X |

Primary Examiner—Arnold Rosenthal
Attorney, Agent, or Firm—Wayne B. Easton; Clayton R. Johnson

[57] ABSTRACT

A water outlet fitting has a housing that includes first and second housing portions with a water outlet passage opening to the water inlet passage at an angle with a sound damper insert extended into part of the outlet passage in the first housing portion. The insert includes a sealing member removable clamped between the housing portions and is connected through a filter to a base located in the closed terminal end portion of the outlet passage axially opposite the opening of the inlet passage to the outlet passage from the sealing member. A generally conical, resilient body has its axially lower end mounted to the base and surround by the filter to form a generally conical air cushion opening to the closed terminal end of the outlet passage and be removable from the outlet passage with the removal of the sealing element.

14 Claims, 2 Drawing Sheets

WATER OUTLET FITTING WITH SOUND DAMPER INSERT

The invention relates to a water outlet fitting comprising at least one first housing portion and a second portion connected thereto, a water outlet passage and a water inlet passage opening into it at an angle, and a sound damper insert in the outlet passage with a base and a damper body connected to the base.

Such a water outlet fitting is known from DE-OS 26 13 951. In this case, a sound damper insert which comprises a resilient air cushion is disposed transversely to the inlet flow. For this purpose, the water outlet fitting has a tapped hole at the end of the water outlet passage opposite to the flow direction and screwthreaded insert carrying the sound damper element is screwed into the tapped hole. The known solution therefore requires an additional water tight screw closure, which makes the fitting more expensive.

It is the problem of the present invention to provide a water outlet fitting into which a sound damper element can be built without additional constructional expense.

This problem is solved in a water outlet fitting of the aforementioned kind in that the water outlet passage extends from the first housing portion into the second housing portion and that the sound damper insert comprises a sealing element which is connected to the base by a connecting element substantially parallel (concentric) to the damper body and is at an axial spacing therefrom and seals the connection between the first and second housing portions.

According to the invention, therefore, multiple use is made of the sealing element that is in any case provided for sealing the connecting point between the two housing portions, the sealing element also serving to hold the sound damper insert in the water outlet passage. No additional alteration has to be undertaken in the housing of the water outlet fitting itself. Instead, the sound damper element can also be inserted in an already existing two-part water outlet fitting housing. For this purpose, it is merely necessary to separate the two parts of the housing as was conventional when replacing the sealing element. Instead of inserting a new conventional sealing ring, it is now possible to insert the sound damper element. By reason of the connection to the sealing element, it stays in the outlet passage so to speak by itself without affecting the seal of the connection. The sound damper is thereby also automatically directed to be transverse to the flow of the water flowing through the inlet passage. This gives good damping properties. The damper body is located between the base and sealing element.

Advantageously, the connecting element is formed by a filter element which surrounds the damper body substantially cylindrically.

If the resilient wall surrounding the air cushion is directly subjected to the flow and thus any dirt particles, this could increase wear. One can counteract this wear by means of a harder material. However, this has a negative influence on the sound damping properties. By means of the advantageous use of a filter as the connecting element, one prevents dirt particles from being flushed directly onto the damper body. This substantially avoids wear. A relatively soft material may be employed, which positively influences the sound damping properties. The filter element has a relatively large surface so that there is practically no danger of blockage. By reason of the large surface area, the filter element offers only a relatively low flow resistance to the incoming water. Despite this, the flow speed of the water is reduced, which further improves the reduction in noise. The filter element is supported at both ends, namely on the one hand at the base and on the other hand at the sealing element, through which it becomes very strong. Since the filter element is arranged practically directly behind the inlet, other control elements of the water outlet fitting, for example a thermostatic mixing valve, need not be protected from dirt particles. The filter element can be readily installed in existing fittings, is maintenance friendly and can be easily replaced.

In a preferred embodiment, the connecting element is formed by a sieve. A sieve, which is employed as a filter, has proved successful in connection with the water fittings. In addition, it already possesses a relatively good inherent stability.

Advantageously, the sealing element is located at the outside of the filter element and has a larger diameter than the base. In other words, the sound damper element has at least two external diameters, namely the external diameter of the sealing element and the external diameter of the base. If the outlet passage likewise has different diameters, for example corresponding to the diameter of the base and the diameter of the sealing element, it is the larger diameter of the sound damper element, namely the diameter of the sealing element, which governs the depth to which the sound damper element can be inserted in the outlet passage. If the sealing element sits on the step formed in the outlet passage, further movement of the sound damper insert into the outlet passage is impossible. There is therefore a defined depth to which the sound damper element can be inserted.

Advantageously, the base has an annular groove which receives the lower end of the damper body. This increases the strength of the damper body. The external wall of the damper body is therefore not held from the outside as is known from the prior art but its lower edge is clamped from the inside and from the outside. Even at a high water pressure, the wall of the damper body cannot be pressed inwardly and water penetrate into the damper body.

Preferably, the annular groove also receives the lower end of the filter element. This defines the positions of the filter element and damper body relatively to each other. No particles can pass the filter and impinge on the damper body.

In another preferred embodiment, the damper body has a conical air cushion which is surrounded by a rubber-elastic wall. The conical shape of the damper element always causes the inflowing water from the inlet passage to strike the damper element at an acute angle, which further improves the sound damping properties.

Advantageously, the wall has supporting ribs. These supporting ribs serve to strengthen the damper body wall so that the damper wall can be made thinner and the enclosed air cushion is better able to damp the oscillations from the water.

Preferably, the supporting ribs are supported against the filter element. The support enables the damper body to be held all around from all sides. The material of the damper body can therefore be still softer, whereby even better damping properties can be achieved.

Advantageously, the base has substantially the same diameter as the end of the outlet passage terminating in the first housing portion. The sound damper insert is therefore not only seated in a predetermined axial position but it is also retained in the radial direction. The sound damper insert can therefore not start to oscillate, which would counteract the damping.

In a preferred embodiment, the length of the damper body is larger than the diameter of the inlet passage and both ends of the damper body project beyong the diameter of the inlet passage. This ensures that a large part of the water flowing through the inlet passage can strike the damping element.

Advantageously, an annular gap is provided between the filter element and the wall of the outlet passage. The inflowing water can thereby be freely distributed around the damper element.

A preferred example of the invention will now be described in conjunction with the drawing, wherein.

Figure 1:
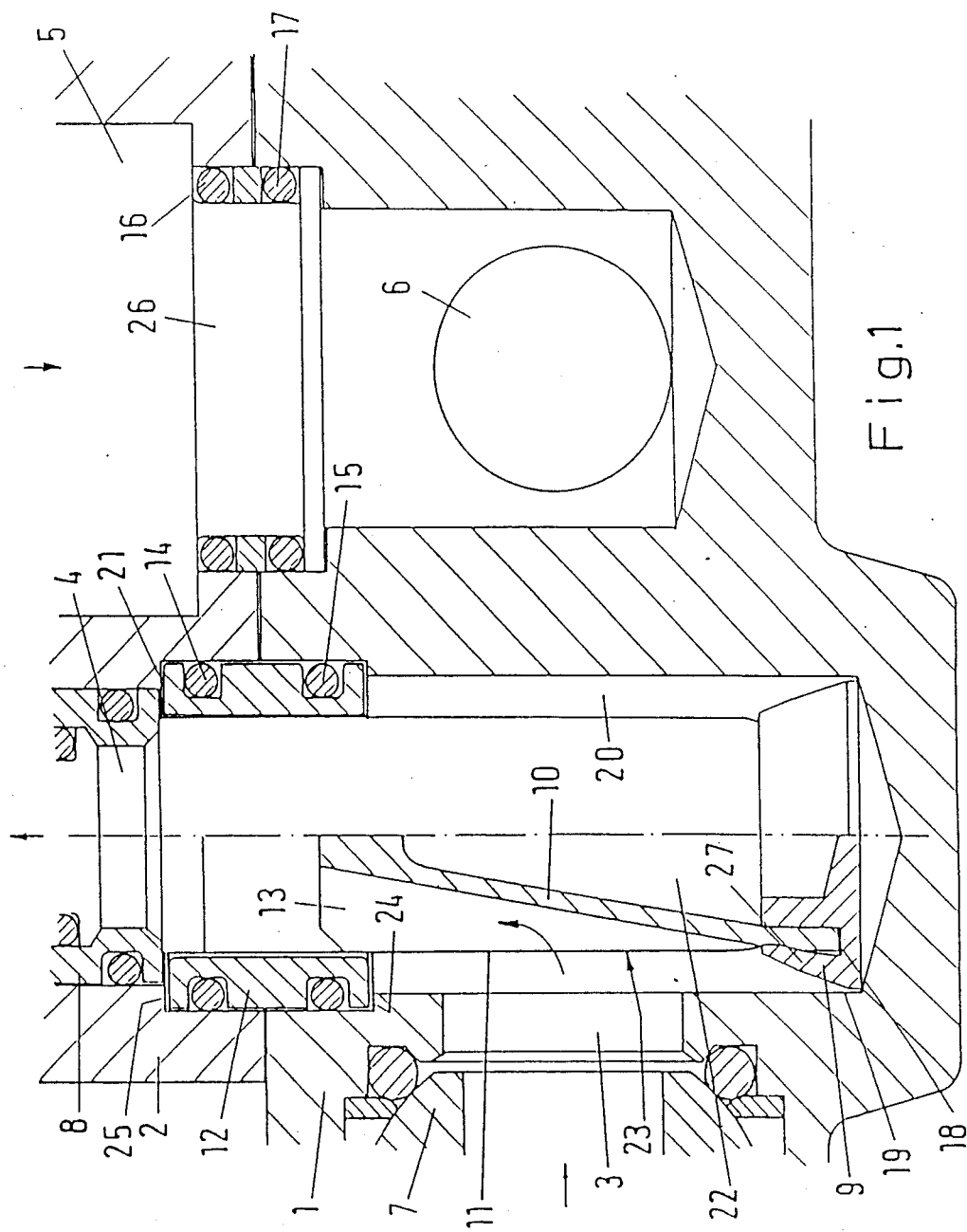
FIG. 1 is a cross-section through the water fitting with the part of the sound damper insert illustrated being shown in cross-section.
Figure 4:
FIG. 4 is a plan view of the damper body.
Figure 2:
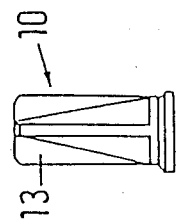
FIG. 2 is a side elevation of the damper body.
Figure 3:
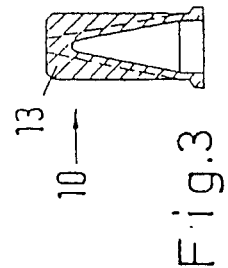
FIG. 3 is a section through the damper body.
Figure 1A:
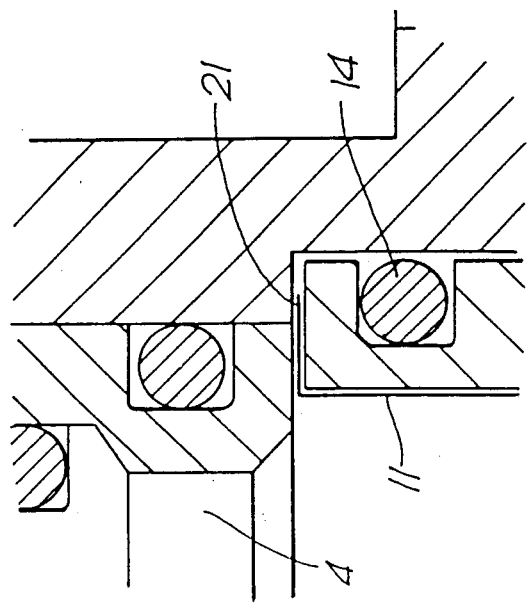

The water outlet fitting comprises a first housing portion 1 and a second housing portion 2 which are interconnected. In the first housing portion 1 there is a water inlet passage 3 which can be closed by a stop valve 7. The water inlet passage 3 opens into a water outlet passage 4 which extends into the second housing portion 2. With the stop valve 7 open, the water flows in the direction of the arrows through the inlet passage 3 and the outlet passage 4 into the second housing portion. It is there mixed with water at a different temperature, for example by a mixing valve of which a portion 8 in the outlet passage 4 is illustrated, before it returns to the first housing portion 1 through an outlet passage 5 in order to leave the water outlet fitting through an outlet aperture 6. At the connecting point between the first and second housing portions 1, 2, a sealing element 26 is arranged in the outlet passage 5 and this seals the connection with the aid of two O-rings 16, 17.

To seal the transition between the first and second housing portions 1, 2, the outlet passage 4 likewise has a sealing element 12 which seals the connecting point with the aid of two O-rings 14, 15. Usually, the passages are round so that the sealing elements 12, 26 can be in the form of sealing rings.

The sealing element 12 is connected to a cylindrical sieve 11. This sieve has at its top a bent flange 21 which rests on the sealing element 12 and can be clamped between the sealing element 12 and a projection 25 found in the second housing portion 2 when the first and second housing portions are interconnected. The flange 21 can also be clamped between the sealing element 12 and mixing valve 8.

Within the sieve there is a damper body 10 which is carried at its lower end in an annular groove 18 of a base 9. The lower end of the sieve 11 is likewise received in this annular groove 18. The damper body 10 has a rubber-elastic wall which encloses a conical air cushion 22. The wall comprises strengthening ribs 13 which are supported inwardly at the sieve 11. The sealing ring 12, sieve 11, damper body 10 and base 9 together form a sound damper element 23.

In this first housing portion 1, the outlet passage 4 has a projection 24 on which the sealing element 12 is seated when it is screwed into the outlet passage 4. The sealing element 12 has a larger diameter than the base 9. The sieve has such a length that the base 9 terminates substantially in the closed end portion 19 of the outlet passage 4 of the housing portion 1. The base 9 has substantially the same diameter as this end of the outlet passage 4.

By means of the sealing element 12, the sieve 11 is so held in the middle of the outlet passage 4 that an annular gap 20 is created between the sieve 11 and the wall of the outlet passage 4. By means of this annular gap, the water can be distributed uniformly and flow around all sides of the sound damper element 23.

The external wall 27 of the base 9, i.e. the wall of the base 9 surrounding the annular groove 18, converges and at its thinner end is to a certain extent prestressed towards the annular groove. The damper body 10 and the sieve 11, which are both received in the annular groove 18, are thereby securely held at the base. Even at an elevated pressure in the outlet passage 4, it is most unlikely that the water will penetrate into the damper body and the air cushion space.

When the stop valve 7 is opened, water flows out of the inlet passage 3 into the outlet passage 4, striking the damper body 10 through the sieve 11, the damper body having a length which is larger than the diameter of the inlet passage 3 and projecting beyond the inlet passage in both directions. The water can be distributed in the annular gap 20 but is must in any case flow through the gap between the tip of the damper element 10 and the sealing element 12. Oscillations in the water that could otherwise be transmitted to the fitting and lead to the development of noise are thereby effectively damped by the rubber-elastic wall and the air cushion 22.

The sieve can, for example, be of wire having a thickness in the range of 0.1 to 0.2 mm. The spacings between adjacent wires amount to about 0.3 to 0.4 mm.

I claim:

1. A water outlet fitting, comprising a housing having at least a first housing portion and a second housing portion, the housing having wall means defining an axially elongated water outlet passage that extends from the first housing portion and into the second housing portion and a water inlet passage opening to the outlet passage at an angle, a sound damper insert in the outlet passage and having a base, a damper body connected to the base, an annular sealing element axially spaced from said base for sealing the connection between the first and second housing portions, and a connecting element substantially parallel to said damper body for connecting said base to said sealing element.

2. A water outlet fitting according to claim 1, characterized in that the wall means includes a wall portion in the first housing portion remote from the second housing portion that defines a closed terminal end of the outlet passage and that the base is of a diameter that is substantially the same as the diameter of the outlet passage axially intermediate the sealing element and the wall portion.

3. A water outlet fitting according to claim 1, characterized in that the connecting element comprises a sieve.

4. A water outlet fitting according to claim 1, characterized in that the damper body is annular, of an axial length that is larger than the diameter of the inlet passage and projects axially on radial opposite sides of the inlet passage.

5. A water outlet fitting according to claim 1, characterized in that the wall means includes a wall portion in the first housing portion remote from the second housing that defines a closed terminal end of the outlet passage, that the base has an annular groove opening toward the sealing element and that the damper body is annular and has a lower end extended into the groove.

6. A water outlet fitting according to claim 5, characterized in that the filter element is annular and has a lower end that is extended into the groove.

7. A water outlet fitting according to claim 1, characterized in that the connecting element comprises a substantially cylindrical filter element that extends around the damper body.

8. A water outlet fitting according to claim 7, characterized in that the sealing element is annular, has a larger outer diameter than the base and extends axially more remote from the base than the filter element.

9. A water outlet fitting according to claim 7, characterized in that the wall means axially adjacent the filter element is annular and of a diameter to provide an annular gap between the filter and the wall means that opens to the opening of the inlet passage to the outlet passage.

10. A water outlet fitting according to claim 1, characterized in that the wall means includes a wall portion in the first portion remote from the second portion that defines a closed terminal end of the outlet passage, and that the damper body comprises a generally conical rubber-elastic damper member opening axially to the wall portion to provide a generally conical air cushion.

11. A water outlet fitting according to claim 11, characterized in that the damper body includes supporting ribs extending radially from the damper member toward the wall means.

12. A water outlet fitting according to claim 11, characterized in that the ribs are supported by the filter element, and that the damper body has a first axial end portion connected to the base and an axial opposite end portion, the axial opposite end portion being connected to the sealing element.

13. A water outlet fitting according to claim 1, characterized in that the wall means includes a wall portion in the first housing portion remote from the second housing that defines a closed terminal end of the outlet passage, that the connecting means comprises an annular filter radially surrounding the damper body and having an axially lower end connected to the base and an axial opposite end, that the base has an annular groove opening toward the sealing element, that the damper body is annular and has a lower end extended into the groove, and that the sealing member is annular and has a larger outer diameter than the maximum diameter of the base, an inner diameter less than the maximum diameter of the base and is removable clamped between the first and second housing portions for removable retaining the filter element, damper body and base in the outlet passage.

14. A water outlet fitting according to claim 13, characterized in that the damper body is made of a resilient material, is shaped to provide a generally axially elongated conical air cushion and opens toward the wall portion in a direction away from the second housing and is axially elongated in a direction transverse to water flow in the inlet passage.

* * * * *